United States Patent [19]

Takeuchi

[11] Patent Number: 5,148,415
[45] Date of Patent: Sep. 15, 1992

[54] MAGNETO-OPTICAL DISC APPARATUS HAVING HEAD-DISC DISTANCE CONTROL

[75] Inventor: Koichi Takeuchi, Amagasaki, Japan

[73] Assignee: Mitsubishi Denki Kabushiki Kaisha, Japan

[21] Appl. No.: 760,591

[22] Filed: Sep. 16, 1991

[30] Foreign Application Priority Data

Sep. 20, 1990 [JP] Japan ................. 2-252567

[51] Int. Cl.⁵ ............... G11B 13/04; G11B 11/10; G11B 11/12
[52] U.S. Cl. ................... 369/13; 360/114; 360/59; 360/103
[58] Field of Search .......... 369/13, 14; 360/59, 360/66, 103, 114

[56] References Cited

U.S. PATENT DOCUMENTS

| 4,706,232 | 11/1987 | Funada et al. | 360/59 |
| 5,091,897 | 2/1992 | Otokawa et al. | 369/13 |
| 5,095,470 | 3/1992 | Oka et al. | 369/13 |

FOREIGN PATENT DOCUMENTS 61-156551 10/1986 Japan .
1-055762 3/1989 Japan ................. 369/13
1-302502 12/1989 Japan ................. 369/13
2-265055 11/1990 Japan .

Primary Examiner—Hoa Nguyen
Attorney, Agent, or Firm—Wolf, Greenfield & Sacks

[57] ABSTRACT

A magneto-optical disc apparatus comprising a distance sensor detecting the distance optically between a magneto-optical disc and a magnetic head, a circuit sample-holding the detected output of the distance sensor, and a controlling mechanism controlling the distance between the magneto-optical disc and the magnetic head in the case where the detected output of the distance sensor is changed suddenly, responsive to a sample-held detected output immediately before the sudden change. Even when the detected output of the distance sensor changes suddenly by receiving a reflected light from a sector mark of the magneto-optical disc, the distance between the magneto-optical disc and the magnetic head does not change suddenly according to the sudden change, since the distance between the both is controlled responsive to the detected output having been sample-held immediately before the sudden change.

10 Claims, 6 Drawing Sheets

MAGNETO-OPTICAL DISC APPARATUS HAVING HEAD-DISC DISTANCE CONTROL

BACKGROUND OF THE INVENTION

1. Field of the Invention

The present invention relates to a magneto-optical disc apparatus, particularly to a mechanism for controlling a distance between a magneto-optical disc and a magnetic head.

2. Description of Related Art

Generally, a magneto-optical disc apparatus is so constructed as to record information by projecting light beam to a magneto-optical disc (hereinafter to be called a disc) rotating in order to record information, then by switching polarity of magnetic field to be given to the projected position of the light beam. When the disc is rotated, there is a fear that information may be recorded inaccurately because a distance between the disc and a magnetic head which applies magnetic field to the disc from the exterior is changed due to a warp of the disc thereby to change magnetic field intensity to be given to the disc. Therefore, servo operation of an actuator supporting the magnetic head is performed so that the magnetic head may follow surface deflection of the disc and the distance between the disc and the magnetic head may be constant.

FIG. 1 is a schematic side view of essential parts of such a conventional magneto-optical disc apparatus. A disc 1 rotates together with a rotary shaft 2 rotated by a spindle motor (not shown). Immediately under the disk 1, a distance sensor 4 and a magnetic head 5 are fixed on an actuator 3. The distance sensor 4 and magnetic head 5 are movable in the direction of an arrow of solid line according to exciting current of an actuating coil 3a operating the actuator 3 thereby to control the distance between the disc 1 and the magnetic head 5. The distance sensor 4 detects the distance between the distance sensor 4 and the disc 1 successively be continuously projecting light to the disc 1 and receiving the reflected light as shown in an arrow of broken line, and the exciting current of the actuating coil 3a is controlled corresponding to the detected output of the distance sensor 4.

Next, explanation will be given on the operation of the magneto-optical disc apparatus.

When the distance servo 4 detects the distance between itself and the disc 1, the exciting current flowing in the actuating coil 3a is changed according to the detected output. The actuator 3 is moved in the direction of the arrow of solid line according to the exciting current of the actuating coil 3a thereby to change a distance d between the magnetic head 5 and the disc 1. In this way, the magnetic head 5 follows surface deflection due to the rotation of the disc 1, and the distance d between the disc 1 and the magnetic head 5 is always kept, for example, 500–600 μm, thereby magnetic field intensity to be given to the disc 1 from the magnetic head 5 is made constant.

By the way, as shown in FIG. 2 being a schematic plan view of the disc 1, a plurality of sector marks 1a, 1a, ... are formed radially from the center of the disc 1, and data area 1b are formed between the adjacent sector marks 1a, 1a. Because each header part is prepitted on each sector mark 1a, there is a possibility that light reflectance is more largely changed at the sector mark 1a than that at the data area 1b. FIG. 3 is a view showing an example of change of detected output of the distance sensor 4, axis of abscissa showing circumferential position of the disc 1 and axis of ordinate showing the detected output of the distance sensor 4. When the distance sensor 4 receives reflected light from the sector mark 1a, spike noise SP whose magnitude is largely changed is generated in the detected output of the distance sensor 4, as shown in FIG. 3, the change being same as that in the state where the distance between the distance sensor 4 and the disc 1 is suddenly changed. Thereby exciting current of the actuating coil 3a of the actuator 3 is to increase largely, leading a problem the servo electric power i to be consumed unnecessarily. And every time the distance sensor 4 receives reflected light from the sector mark 1a, the actuator 3 is actuated, leading a problem that servo operation of the magnetic head 5 is unstabilized. Moreover, at a position of the sector mark 1a, the magnetic head 5 is moved in close to the disc 1 more than necessity, leading a fear that the magnetic head 5 and the disc 1 may be damaged.

SUMMARY OF THE INVENTION

The magneto-optical disc apparatus of the present invention comprises a distance sensor for detecting optically a distance between a magneto-optical disc and a magnetic head, a circuit for sample-holding the detected output of the distance sensor, controlling means for controlling the distance between the magneto-optical disc and the magnetic head on the basis of a detected output held immediately before a sudden change in the case where the detected output of the distance sensor suddenly changes.

In the magneto-optical disc apparatus of the present invention, even when the reflected light from a sector mark of the magneto-optical disc is received and the detected output of the distance sensor is suddenly changed, the distance between the magneto-optical disc and the magnetic head is controlled on the basis of the detected output held immediately before the sudden change, therefore there is not possibility that the distance therebetween is never changed suddenly responsive to the sudden change.

An object of the invention is to provide a magneto-optical disc apparatus which does not consume servo electric power unnecessarily.

Another object of the invention is to provide a magneto-optical disc apparatus capable of stabilizing the servo operation of the magnetic head because the magnetic head is made to follow only surface deflection of the magneto-optical disc.

A further object of the invention is to provide a magneto-optical disc apparatus which has not fear that the magneto-optical disc and the magnetic head are damaged.

Yet another further object of the invention is to provide a magneto-optical disc apparatus capable of giving a constant magnetic field intensity to the magneto-optical disc and of recording information in the magneto-optical disc correctly with high density.

The above and further objects and features of the invention will more fully be apparent from the following detailed description with accompanying drawings.

DESCRIPTION OF THE PREFERRED EMBODIMENTS

In the following, explanation will be given on the present invention referring to drawings showing the embodiments thereof.

Figure 4:
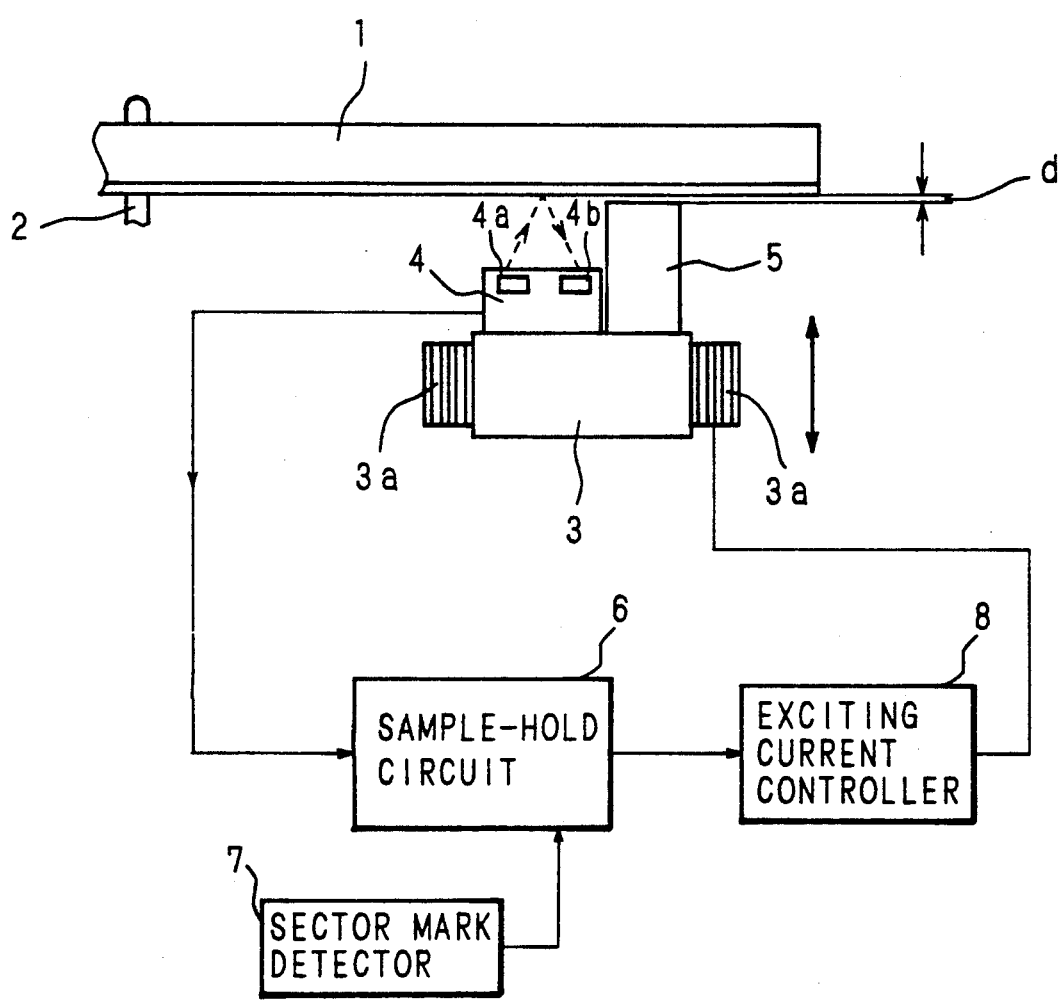
FIG. 4 is a block diagram of essential parts of the magneto-optical disc apparatus related to the invention.

FIG. 4 is a block diagram of essential parts of the magneto-optical disc apparatus related to the invention, and a magneto-optical disc (hereinafter to be called disc) 1 is rotated together with a rotary shaft 2 by a spindle motor (not shown). Immediately under the disc 1, a distance sensor 4 and a magnetic head 5 generating magnetic field are fixed on an actuator 3. When exciting current is flown in an actuating coil 3a of the actuator 3 in order to operate the actuator 3, the distance sensor 4 and the magnetic head 5 are moved in the direction of an arrow of solid line according to the exciting current, thereby changing the distance between the disc 1 and the magnetic head 5.

The distance sensor 4 has a plurality of LEDs (Laser emitting Diodes) 4a and a plurality of PSD (Position Sensitive Detector) elements 4b. Only parallel components parallel of emitting light from the LED 4a irradiate the disc 1, for the emitting light passes through slit in the distance sensor 4. This light is reflected by the disc 1 and an image of the slit is formed on the PSD element 4b in the distance sensor 4. And since the PSD element 4b obtains output corresponding to a light spot position on the element, a distance change can be detected by the distance sensor 4 by projecting emitting light from the LED 4a to the surface of the disc 1 from the direction other than vertical direction. And the detected output of the distance sensor 4 is given to a sample-hold circuit 6.

A sector mark detector 7 detects sector mark position at the disc 1, for example, it detects the sector mark position from a controlling unit (not shown) which reads out a header part when data is written into the disc 1. And the output signal of the sector mark detector 7 is given to the sample-hold circuit 6 as timing signal which makes the detected output held by the sample-hold circuit 6 to output immediately before the detection of the sector mark. The detected output from the sample-hold circuit 6 is inputted to an exciting current controller 8, and the controller 8 supplies exciting current corresponding to the inputted detected output to the actuating coil 3a of the actuator 3.

Figure 1:
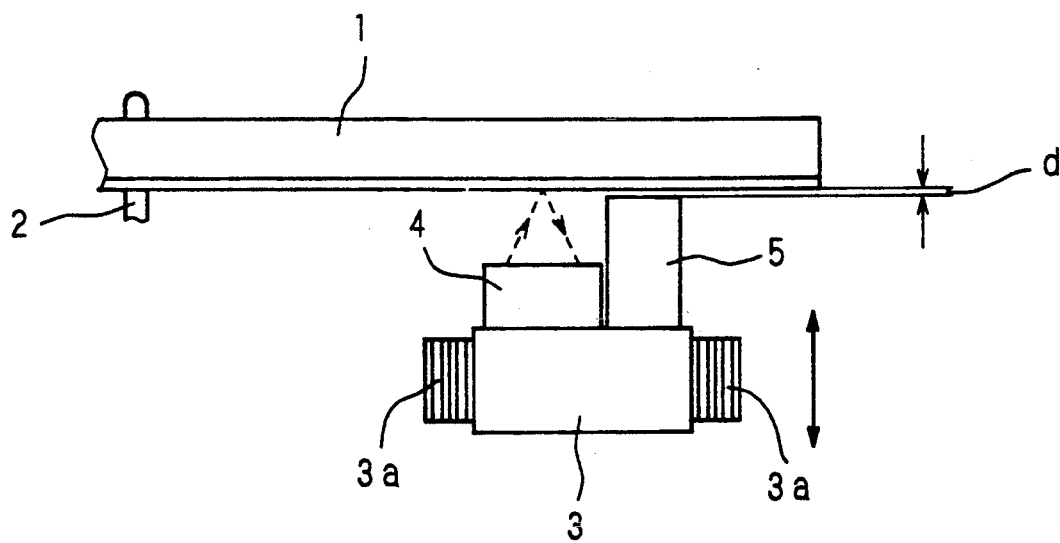
FIG. 1 is a schematic side view of a conventional magneto-optical disc apparatus.
Figure 2:
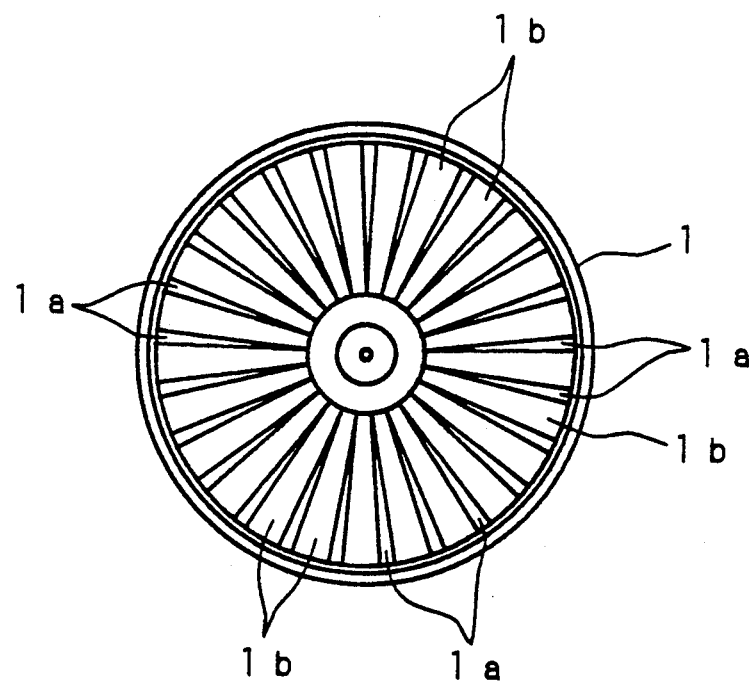
FIG. 2 is a schematic plan view of a magneto-optical disc.
Figure 3:
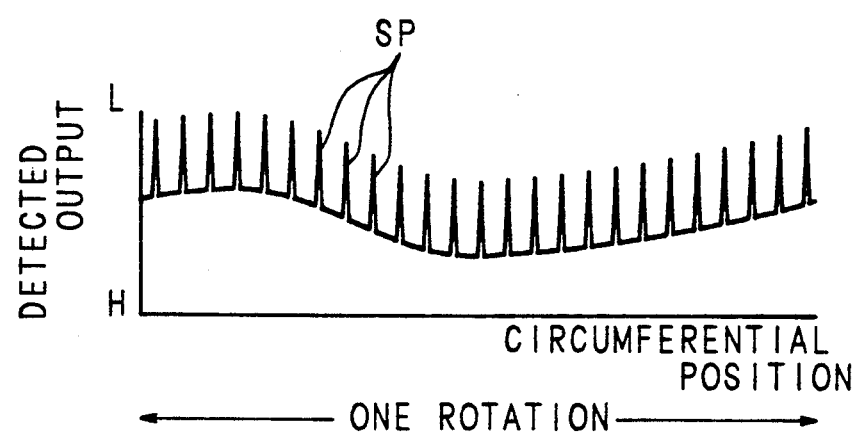
FIG. 3 is a waveform view showing change of the detected output of a distance sensor.
Figure 5:
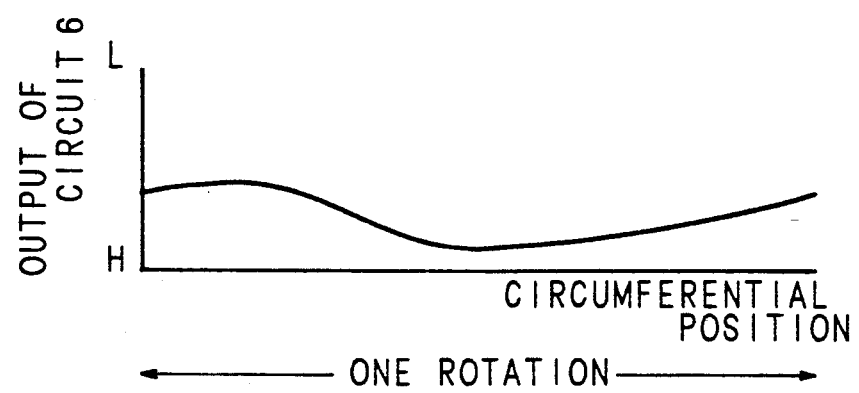
FIG. 5 is a waveform view showing change of output of a sample-hold circuit in the present invention.

Next, explanation will be given on the operation of the magneto-optical disc apparatus having such a construction, referring to FIG. 2 showing a construction of the disc, FIG. 3 showing change of the detected output of the distance sensor 4, and FIG. 4 showing change of output from the sample-hold circuit 6. In FIG. 5 axis of abscissa shows circumferential position of the disc 1 and axis of ordinate shows output (input to the exciting current controller 8) from the sample-hold circuit 6.

Now, the disc 1 is rotated by a motor (not shown). On the other hand, as shown in an arrow of broken line, the distance sensor 4 projects emitting light to the disc 1 and receives the reflected light to detect distance between the distance sensor 4 and the disc 1. Then, the detected output of the distance sensor 4 is changed as shown in FIG. 3 responsive to detected distance, that is, surface deflection, and every time the distance sensor 4 receives the reflected light from the sector mark 1a (refer to FIG. 2) of the disc 1, spike noise SP is generated in the detected output. The detected output of the distance sensor 4 which changes in this way is given to the sample-hold circuit 6.

Here, when the sector mark detector 7 does not detect the sector mark 1a, the output signal of the sector mark detector 7 is not obtained, and the detected output of the distance sensor 4 having been inputted to the sample-hold circuit 6 is inputted intact to the exciting current controller 8. On the other hand, when the sector mark detector 7 detects the sector mark 1a, the detected output of the distance sensor 4, which has been held at the sample-hold circuit 6 immediately before the detected output of the distance sensor 4 changes suddenly, is inputted to the exciting current controller 8. Accordingly, the detected output inputted to the exciting current controller 8 is, as shown in FIG. 5, the one in which spike noise is not generated. And the exciting current controller 8 supplies exciting current corresponding to the inputted detected output shown in FIG. 5 to the actuating coil 3a to operate the actuator 3, then to make the magnetic head 5 follow surface deflection due to the rotation of the disc 1 thereby to keep the distance d between the disc 1 and the magnetic head 5 to be constant.

In addition, in this embodiment, the output from the sample-hold circuit 6 is made to be switched according to the output signal from the sector mark detector 7, however, its doesn't matter that the output is switched in the same way according to change of reflected light from the disc 1.

Figure 6:
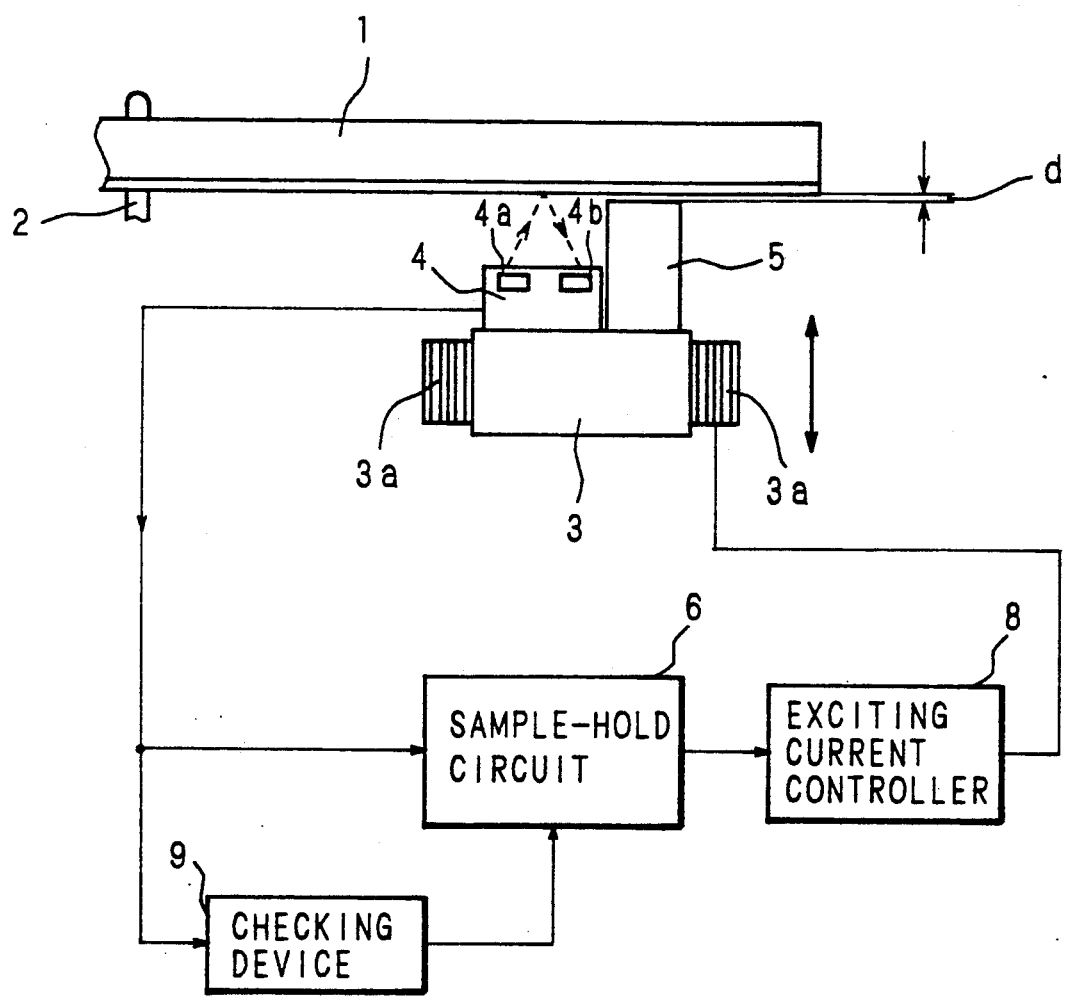
FIG. 6 is a block diagram of essential parts of another embodiment of the magneto-optical disc apparatus related to the invention.

FIG. 6 is a block diagram of essential parts of another embodiment of the invention. In the figure, as the parts of the same numbers as in FIG. 4 designate the same parts, explanation thereof will be omitted. As the detected output of the distance sensor 4 changes suddenly corresponding to the sector mark 1a, it is possible to determined control timing on the basis of a magnitude of the detected output of the distance sensor 4. In the figure, reference numeral 9 designates a checking device for checking whether the detected detecting output of the distance sensor 4 is within a predetermined range or not, and in the case where the detected output of the distance sensor 4 is beyond the predetermined range, the checking device 9 outputs an output signal to the sample-hold circuit 6.

And, when the output signal from the checking device 9 is not inputted to the sample-hold circuit 6, the detected output of the distance sensor 4 having been inputted to the sample-hold circuit 6 is inputted intact to the exciting current controller 8. On the other hand, the output signal from the checking device 9 is inputted to the sample-hold circuit 6, the detected output of the distance sensor 4, which has been held in the sample-hold circuit 6 immediately before the detected output of the distance sensor 4 changes suddenly, is inputted to the exciting current controller 8. In addition, another operation is same as that of aforementioned embodiment.

As aforementioned, in this invention, the magnetic field intensity to be given to the disc 1 is constant without the effect of surface deflection of the disc 1, thereby information can be recorded correctly with high density in the disc 1. Moreover, as the actuator 3 is not operated in relation to spike noise, servo electric power is not required unnecessarily, and the servo operation of the magnetic head 5 is stabilized. Furthermore, the magnetic head 5 does not move in close to the disc 1 at the sector mark position more than necessity, there is no possibility that the disc 1 and the magnetic 5 may be damaged.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A magneto-optical disc apparatus, comprising:
    a magnetic head for generating a magnetic field to a magneto-optical recording disc, said magnetic head being movable in a direction to and from said magneto-optical disc;
    detecting means having an output for detecting optically the distance between said magneto-optical disc and said magnetic head;
    checking means having an input connected to the output of the detecting means and having an output for checking whether the detected output of said detecting means is within a predetermined range;
    a sample-hold circuit having an input connected to the output of the detecting means and having a control input connected to the output of the checking means and having an output for sample-holding the detected output of said detecting means; and
    controlling means having an input connected to the output of the sample-hold circuit for controlling the position of said magnetic head on the basis of the detected output of said detecting means so that the distance between said magneto-optical disc and said magnetic head may be constant: wherein
    in the case where the detected output of said detecting means becomes beyond said predetermined range, said controlling means controls the position of said magnetic head on the basis of the detected output sample-held in said sample-hold circuit immediately before the time when said detected output becomes beyond said predetermined range.

2. A magneto-optical disc apparatus as set forth in claim 1, wherein
    said detecting means has a light-emitting element emitting an irradiation light to said magneto-optical disc and a light-receiving element receiving a reflected light from said magneto-optical disc for said irradiation light.

3. A magneto-optical disc apparatus as set forth in claim 1, further comprising;
    an actuator on which said magnetic head and said detecting means are integrally disposed, being movable in a direction to and from said magneto-optical disc.

4. A magneto-optical disc apparatus as set forth in claim 3, further comprising;
    an actuating coil fixed to said actuator, making said actuator move according to exciting current flowing therein.

5. A magneto-optical disc apparatus as set forth in claim 4, wherein
    said controlling means has an electric current controlling circuit controlling the exciting current flowing in said actuating coil.

6. A magneto-optical disc apparatus, comprising:
    a magnetic head for generating a magnetic field to a magneto-optical recording disc, said magnetic head being movable in a direction to and from said magneto-optical disc;
    distance detecting means having an output for detecting optically the distance between said magneto-optical disc and said magnetic head;
    sector mark detecting means for detecting a sector mark of said magneto-optical disc;
    a sample-hold circuit having an input connected to the output of the detecting means and having a control input connected to the output of the sector mark detecting means and having an output for sample-holding the detected output of said distance detecting means; and
    controlling means having an input connected to the output of the sample-hold circuit for controlling the position of said magnetic head on the basis of the detected output of said distance detecting means so that the distance between said magneto-optical disc and said magnetic head may be constant; wherein
    in the case where said sector mark detecting means detects a sector mark, said controlling means controls the position of said magnetic head on the basis of the detected output sample-held in said sample-hold circuit immediately before the time when said sector mark detecting means detects said sector mark.

7. A magneto-optical disc apparatus as set forth in claim 6, wherein
    said detecting means has a light-emitting element emitting an irradiation light to said magneto-optical disc and a light-receiving element receiving a reflected light from said magneto-optical disc for said irradiation light.

8. A magneto-optical disc apparatus as set forth in claim 6, further comprising;
    an actuator on which said magnetic head and said distance detecting means are integrally disposed, being movable in a direction to and from said magneto-optical disc.

9. A magneto-optical disc apparatus as set forth in claim 8, further comprising;
    an actuating coil fixed to said actuator, making said actuator move according to exciting current flowing therein.

10. A magneto-optical disc apparatus as set forth in claim 9, wherein
    said controlling means has an electric current controlling circuit controlling the exciting current flowing in said actuating coil.

* * * * *